United States Patent
Duyvesteyn

(10) Patent No.: US 10,450,634 B2
(45) Date of Patent: Oct. 22, 2019

(54) SCANDIUM-CONTAINING MASTER ALLOYS AND METHOD FOR MAKING THE SAME

(71) Applicant: Scandium International Mining Corporation, Sparks, NV (US)

(72) Inventor: Willem P. C. Duyvesteyn, Sparks, NV (US)

(73) Assignee: Scandium International Mining Corporation, Sparks, NV (US)

( * ) Notice: Subject to any disclaimer, the term of this patent is extended or adjusted under 35 U.S.C. 154(b) by 81 days.

(21) Appl. No.: 15/664,999

(22) Filed: Jul. 31, 2017

(65) Prior Publication Data

US 2018/0030577 A1 Feb. 1, 2018

Related U.S. Application Data

(63) Continuation-in-part of application No. PCT/US2016/016754, filed on Feb. 5, 2016.

(60) Provisional application No. 62/114,670, filed on Feb. 11, 2015.

(51) Int. Cl.
| | |
|---|---|
| *C22C 1/03* | (2006.01) |
| *C01F 17/00* | (2006.01) |
| *C22C 1/02* | (2006.01) |
| *C22C 21/00* | (2006.01) |
| *C22C 21/06* | (2006.01) |
| *C22C 23/02* | (2006.01) |

(Continued)

(52) U.S. Cl.
CPC ............ *C22C 1/03* (2013.01); *C01F 17/0043* (2013.01); *C22B 59/00* (2013.01); *C22C 1/02* (2013.01); *C22C 21/00* (2013.01); *C22C 21/06* (2013.01); *C22C 23/02* (2013.01); *C22C 23/06* (2013.01)

(58) Field of Classification Search
CPC .. C22C 1/02; C22C 1/03; C22C 21/00; C22C 23/00; C22C 29/12; C22C 32/0015; C01F 17/0043

See application file for complete search history.

(56) References Cited

U.S. PATENT DOCUMENTS

| | | | |
|---|---|---|---|
| 3,619,181 | A | 11/1971 | Willey |
| 4,689,090 | A | 8/1987 | Sawtell et al. |

(Continued)

FOREIGN PATENT DOCUMENTS

| | | |
|---|---|---|
| CA | 2398667 C | 5/2010 |
| CN | 1605641 A | 4/2005 |

(Continued)

OTHER PUBLICATIONS

Kim, YW. & Dimiduk, D.M. "Progress in the understanding of gamma titanium alunninides." JOM 43: 40. https://doi.org/10.1007/BF03221103 (Year: 1991).*

(Continued)

*Primary Examiner* — Tima A. McGuthry-Banks
(74) *Attorney, Agent, or Firm* — John A. Fortkort; Fortkort & Houston PC

(57) ABSTRACT

A method (101) is provided for making a scandium-containing alloy. The method includes providing a molten metal (103), and mixing the molten metal with a scandium-containing precursor (113) which undergoes thermal decomposition at the temperature of the molten metal to produce scandium oxide, thereby producing a scandium-containing alloy.

24 Claims, 2 Drawing Sheets

(51) Int. Cl.
C22C 23/06 (2006.01)
C22B 59/00 (2006.01)

(56) References Cited

U.S. PATENT DOCUMENTS

| | | | |
|---|---|---|---|
| 4,842,819 A * | 6/1989 | Huang | C22C 14/00 148/421 |
| 4,950,560 A | 8/1990 | Tarcy | |
| 4,980,141 A | 12/1990 | Kimura et al. | |
| 5,037,608 A | 8/1991 | Tarcy et al. | |
| 5,055,257 A | 10/1991 | Chakrabarti et al. | |
| 5,238,646 A | 8/1993 | Tarcy et al. | |
| 5,597,529 A | 1/1997 | Tack | |
| 5,620,652 A | 4/1997 | Tack et al. | |
| 5,624,632 A | 4/1997 | Baumann et al. | |
| 5,759,868 A | 6/1998 | Ogawa et al. | |
| 5,779,761 A | 7/1998 | Armstrong et al. | |
| 5,804,879 A | 9/1998 | Ogawa et al. | |
| 5,830,786 A | 11/1998 | Zhang et al. | |
| 5,882,449 A | 3/1999 | Waldron et al. | |
| 6,045,631 A | 4/2000 | Tarcy et al. | |
| 6,074,498 A | 6/2000 | Waldron et al. | |
| 6,139,653 A | 10/2000 | Fernandes et al. | |
| 6,248,453 B1 | 6/2001 | Watson | |
| 6,315,948 B1 | 11/2001 | Lenczowski et al. | |
| 6,352,671 B1 | 3/2002 | Daech et al. | |
| 6,363,314 B1 | 3/2002 | Hafner et al. | |
| 6,383,314 B1 | 5/2002 | Dunbar et al. | |
| 6,395,111 B1 | 5/2002 | Pfannenmuller et al. | |
| 6,866,817 B2 | 3/2005 | Hsiao | |
| 6,974,510 B2 | 12/2005 | Watson | |
| 7,048,815 B2 | 5/2006 | Senkov et al. | |
| 7,648,593 B2 | 1/2010 | Pandey | |
| 8,303,736 B2 * | 11/2012 | Matsuoka | B22D 11/003 148/415 |
| 2003/0127165 A1 | 7/2003 | Magnusen et al. | |
| 2004/0188053 A1 | 9/2004 | Brice | |
| 2008/0199348 A1 | 8/2008 | Armstrong et al. | |
| 2012/0207656 A1 | 8/2012 | Duyvesteyn | |
| 2013/0220497 A1 | 8/2013 | Huskamp et al. | |

FOREIGN PATENT DOCUMENTS

| | | |
|---|---|---|
| CN | 101186987 A | 5/2008 |
| CN | 101709394 A | 5/2010 |
| EP | 0918095 A1 | 5/1999 |
| EP | 2298944 B1 | 3/2011 |
| GB | 2188064 A | 3/1987 |
| RU | 2124574 C1 | 1/1999 |
| RU | 2211872 C1 | 9/2003 |
| RU | 2213795 C1 | 10/2003 |
| RU | 2218436 C1 | 12/2003 |
| WO | 1995026420 A1 | 10/1995 |
| WO | 9532074 A2 | 11/1995 |
| WO | 03042418 A1 | 5/2003 |
| WO | 2006079353 A1 | 8/2006 |
| WO | 2007092294 A1 | 8/2007 |
| WO | WO 2016/130426 A1 * | 8/2016 |

OTHER PUBLICATIONS

Oliker, V.E. & Trefilov, V.I. "Effect of Scandium and Chromium on the Structure and Heat Resistance of Alloys Based on g-TiAl." Powder Metallurgy and Metal Ceramics. 39: 487. https://doi.org/10.1023/ (Year: 2000).*
Emmanuelle A. Marquis, David N. Seidman, Mark Asta, Christopher Woodward, "Composition evolution of nanoscale Al3Sc precipitates in an Al—Mg—Sc alloy: Experiments and computations", Acta Materialia 54 (2006) 119-130.
Emmanuelle A. Marquis and David N. Seidman, "Nanostructural evolution of Al3Sc precipitates in an Al—Sc—Mg alloy by three-dimensional atom probe microscopy", Surf. Interface Anal. 2004; 36: 559-563.
Emmanuelle A. Marquis, David N. Seidman, David C. Dunand, "Effect of Mg addition on the creep and yield behavior of an Al—Sc alloy", Acta Materialia 51 (2003) 4751-4760.
E. A. Marquis and D. N. Seidman, "Nanoscale Structural Evolution of Al3Sc Precipitates in Al (Sc) Alloys", Acta mater. 49 (2001) 1909-1919.
D. Vojtich, "Challenges for Research and Development of New Aluminum Alloys", Metalurgija 49, 3 (2010) 181-185.
Darko Simonovic and Marcel H. F. Sluiter, "Predicting the Benefits of Adding Ternary Elements to Al—Sc Alloys", Materials Research Society Symposium Proceedings.—Warrendale, Pa .; Materials Research Society; 1999, 2007.—T. 979.-C. 18.
Christian B. Fuller, Albert R. Krause, David C. Dunand, David N. Seidman, "Microstructure and mechanical properties of a 5754 aluminum alloy modified by Sc and Zr additions", Materials Science and Engineering A338 (2002) 8-16.
Y. Harada, D.C. Dunand, "Microstructure of Al3Sc with ternary transition-metal additions", Materials Science and Engineering A329-331 (2002) 686-695.
E. A. Marquis, D. N. Seidman, M. Asta, C.Woodward, and V. Ozolin, "Mg Segregation at Al=Al3Sc Heterophase Interfaces on an Atomic Scale: Experiments and Computations", Physical Review Letters vol. 91, No. 3 (Jul. 18, 2003).
J. Røyset and N. Ryum, "Scandium in aluminium alloys", International Materials Reviews vol. 50 No. 1 (2005) 19-44.
Emmanuelle A. Marquis, David C. Dunand, "Model for creep threshold stress in precipitation-strengthened alloys with coherent particles", Scripta Materialia 47 (2002) 503-508.
Y. Harada, D.C. Dunand, "Thermal expansion of Al3Sc and Al3(Sc0:75X0:25)", Scripta Materialia 48 (2003) 219-222.
Christian B. Fuller, David N. Seidman, and David C. Dunand, "Creep Properties of Coarse-Grained Al(Sc) Alloys at 300° C.", Scripta Materialia, vol. 40, No. 6 (1999) 691-696.
Anton Smolej, Brane Skaza, Edvard Slacek, "Superplasticity of the 5083 Aluminium Alloy With the Addition of Scandium", Materials and technology 43, 6 (2009) 299-302.
Marsha E. Van Dalen, Richard A. Karnesky, Joseph R. Cabotaje, David C. Dunand, David N. Seidman, "Erbium and ytterbium solubilities and diffusivities in aluminum as determined by nanoscale characterization of precipitates", Acta Materialia 57 (2009) 4081-4089.
Youn-Bae Kang, Arthur D. Pelton, Patrice Chartrand, and Carlton D. Fuerst, "Critical Evaluation and Thermodynamic Optimization of the Al—Ce, Al—Y, Al—Sc and Mg—Sc Binary Systems", Calphad vol. 32 (2008) 413-422.
Dang et al., "Effect of Sc and Zr on microstructures and mechanical properties of as-cast Al—Mg—Si—Mn alloys", Trans. Nonferrous Met. Soc. China 19(2009) 540-544.
Ye et al., "Differences of grain-refining effect of Sc and Ti additions in aluminum by empirical electron theory analysis", Trans. Nonferrous Met. Soc. China 20(2010) 465-470.
Jostein Jostein Röyset, "Scandium in Aluminium Alloys Overview: Physical Metallurgy, Properties and Applications", Metallurgical Science and Technology (2007) 11-21.
Marsha E. Van Dalen, David C. Dunand, David N. Seidman, "Precipitation Strengthening in Al (Sc,Ti) Alloys", Affordable Metal Matrix Composites for High Performance Applications II (MS&T 2003) 195-201.
Richard A. Karnesky, Liang Meng, David N. Seidman, David C. Dunand, "Mechanical Properties of a Heat-Treatable Al—Sc Alloy Reinforced with Al2O3 Dispersoids", Affordable Metal Matrix Composites for High Performance Applications II (MS&T 2003) 215-224.
S. P. Yatsenko and N. A. Sabirzyanov, "Synthesis of compounds of impurities with chemically active additives in liquid aluminum and gallium", Journal of Physics: Conference Series 98 (2008) 032008.
A. B. Shubin, K. Yu Shunyaev, "Thermodynamic properties of liquid Sc—Al alloys: model calculations and experimental data", Journal of Physics: Conference Series 98 (2008) 032017.
S. P. Yatsenko, N. A. Sabirzyanov and A. S. Yatsenko, "Dissolution rates and solubility of some metals in liquid gallium and aluminum", Journal of Physics: Conference Series 98 (2008) 062032.

(56) References Cited

OTHER PUBLICATIONS

A. L. Beresina and E. A. Segida, "Microstructure Formation in Binary Al—Tm Alloys under Non-equilibrium Solidification", Journal of Physics: Conference Series 144 (2009) 012096.

He Yongdong, Zhang Xinming and Cao Zhiqiang, "Effect of minor Sc and Zr addition on grain refinement of as-cast Al—Zn—Mg—Cu alloys", China Foundry vol. 6, No. 3 (Aug. 2009) 214-218.

David N. Seidman, Emmanuelle A. Marquis, David C. Dunand, "Precipitation strengthening at ambient and elevated temperatures of heat-treatable Al(Sc) alloys", Acta Materialia 50 (2002) 4021-4035.

Emmanuelle A. Marquis, David N. Seidman, "Coarsening kinetics of nanoscale Al3Sc precipitates in an Al—Mg—Sc alloy", Acta Materialia 53 (2005) 4259-4268.

Marsha E. Van Dalen, David C. Dunand, David N. Seidman, "Effects of Ti additions on the nanostructure and creep properties of precipitation-strengthened Al—Sc alloys", Acta Materialia 53 (2005) 4225-4235.

Ofer Beeri, David C. Dunand, David N. Seidman, "Roles of impurities on precipitation kinetics of dilute Al—Sc alloys", Materials Science and Engineering A 527 (2010) 3501-3509.

M. Cabibbo, E. Evangelista, "Combined Effect of a Deformation Stiff and Disperseidal Plastics of Zr and Sc + Zr on the Aging Process Microstructure of an Al—Mg—Si Alloy", La Metallurgia Italiana (2006) 17-25.

Y. Harada and D. C. Dunand, "Creep Properties of Al3Sc and Al3(Sc, X) Intermetallics", Acta mater. 48 (2000) 3477-3487.

Wattanachai Prukkanon, Satit Chanpum and Chaowalit Limmaneevichitr, "Effect of Sc on Precipitation Hardening of AlSi6Mg Alloy", J. Mater. Sci. Technol., vol. 24 No. 1 (2008) 17-20.

Christian B. Fuller, Joanne L. Murray, David N. Seidman, "Temporal evolution of the nanostructure of Al (Sc,Zr) alloys: Part I—Chemical compositions of Al3(Sc1xZrx) precipitates", Acta Materialia 53 (2005) 5401-5413.

Christian B. Fuller, David N. Seidman, "Temporal evolution of the nanostructure of Al(Sc,Zr) alloys: Part II—coarsening of Al3(Sc1xZrx) precipitates", Acta Materialia 53 (2005) 5415-5428.

Christian B. Fuller, David N. Seidman, David C. Dunand, "Mechanical properties of Al(Sc,Zr) alloys at ambient and elevated temperatures", Acta Materialia 51 (2003) 4803-4814.

Y. Harada, D.C. Dunand, "Microstructure of Al3Sc with ternary rare-earth additions", Intermetallics 17 (2009) 17-24.

D.A. Hughes, M.E. Kassner, M.G. Stout, and J.S. Vetrano, "Metal Forming at the Center of Excellence for the Synthesis and Processing of Advanced Materials", JOM, 50 (6) (1998), pp. 16-21.

J. Røyset, Jr. Leinum, H.-G. Øverlie and O. Reiso, "An Investigation of the Solubility of Scandium in Iron-bearing Constituent Particles in Aluminium Alloys", Materials Science Forum vols. 519-521 (2006) pp. 531-536.

Jostein Røyset, Nils Ryum, "Kinetics and mechanisms of precipitation in an Al-0.2 wt.% Sc alloy", Materials Science and Engineering A 396 (2005) 409-422.

B. Forbord, H. Hallem, J. Røyset, K. Marthinsen, "Thermal stability of Al3(Scx,Zr1-x)-dispersoids in extruded aluminium alloys", Materials Science and Engineering A 475 (2008) 241-248.

Jostein Røyset, Nils Ryum, Diego Bettella, Alessio Tocco, Zhihong Jia, Jan Ketil Solberg, Oddvin Reiso, "On the addition of precipitation- and work-hardening in an Al—Sc alloy", Materials Science and Engineering A 483-484 (2008) 175-178.

Richard A. Karnesky, Marsha E. Van Dalen, David C. Dunand and David N. Seidman, "Effects of substituting rare-earth elements for scandium in a precipitation-strengthened Al-0.08 at. %Sc alloy", Scripta Materialia 55 (2006) 437-440.

Richard A. Karnesky, David C. Dunand, David N. Seidman, "Evolution of nanoscale precipitates in Al microalloyed with Sc and Er", Acta Materialia 57 (2009) 4022-4031.

Richard A. Karnesky, David N. Seidman and David C. Dunand, "Creep of Al—Sc Microalloys with Rare-Earth Element Additions", Materials Science Forum vols. 519-521 (2006) pp. 1035-1040.

Keith E. Knipling, David C. Dunand, David N. Seidman, "Criteria for Developing Castable, Creep-Resistant Aluminum-Based Alloys—A Review", Z. Metallkd. 97, 3 (2006) 246-265.

Keith E. Knipling, Richard A. Karnesky, Constance P. Lee, David C. Dunand, David N. Seidman, "Precipitation evolution in Al-0.1Sc, Al-0.1Zr and Al-0.1Sc-0.1Zr (at.%) alloys during isochronal aging", Acta Materialia 58 (2010) 5184-5195.

E.A. Marquis, J.L. Riesterer, D.N. Seidman, and D.J. Larson, "Mg segregation at coherent and semi-coherent Al/Al3Sc interfaces", vol. 12 Issue S02 (Jul. 31, 2006).

Emmanuelle A. Marquis, David N. Seidman ?, David C. Dunand, Acta Materialia 51 (2003) 285-287.

Matthew E. Krug, Alexandra Werber, David C. Dunand, David N. Seidman, "Core-shell nanoscale precipitates in Al-0.06 at.% Sc microalloyed with Tb, Ho, Tm or Lu", Acta Materialia xxx (2009) xxx-xxx.

* cited by examiner

SCANDIUM-CONTAINING MASTER ALLOYS AND METHOD FOR MAKING THE SAME

CROSS-REFERENCE TO RELATED APPLICATION

This application is a continuation-in-part of PCT/US2016/016754, filed on Feb. 5, 2016, having the same title, the same inventor, and which is incorporated herein by reference in its entirety, which claims the benefit of priority from U.S. provisional application No. 62/114,670, filed Feb. 11, 2015, having the same title, the same inventor, and which is incorporated herein by reference in its entirety.

FIELD OF THE DISCLOSURE

The present disclosure relates generally to master alloys, and more particularly to scandium-containing master alloys and methods for making the same.

BACKGROUND OF THE DISCLOSURE

Although it was discovered in 1879, for much of its history, scandium has been a commercially insignificant metal with few practical uses. More recently, however, scandia-stabilized zirconia has gained importance as a high efficiency electrolyte in solid oxide fuel cells, while high-intensity discharge (HID) lamps use scandium iodide for sports stadium and arena lighting to provide daytime-like color for television. Scandium alloys, and especially scandium aluminum alloys, have also attracted interest in various aerospace applications, as demonstrated by their use in the MiG-21 and MiG-29 aircraft.

Scandium alloys offer numerous advantages over other metal alloys in various applications. For example, some scandium-reinforced alloys are much stronger than their non-scandium counterparts. Moreover, the use of scandium in some metal alloys significantly improves the grain refinement of the alloys, and eliminates hot cracking and improves strength in welds. Scandium alloys also exhibit good resistance to corrosion.

Scandium-aluminum alloys are of particular commercial interest, since these alloys exhibit a lower specific gravity compared to the more widely used titanium aluminum alloys. Thus, for example, Sc—Al has a specific gravity of 2.8 compared to 4.5 for $Ti_6Al_4V$. In a commercial airline fleet, this difference in specific gravity translates into substantial fuel savings on an annual basis.

Despite the many advantages offered by scandium and its alloys, the widespread use of scandium has been hampered by the low availability (and consequently high cost) of the metal. Although scandium is not a particularly rare metal in terms of its abundance in the Earth's crust, there are currently no known, easily extractable deposits of minerals which contain high concentrations of the metal. Consequently, most scandium today is obtained as a byproduct of other metal recovery processes, typically from the treatment of tailings or metal sludges obtained from the refining of other metals. For example, scandium is frequently recovered as a byproduct of the treatment of tungsten and uranium tailings, or from waste streams resulting from the processing of titanium-containing ores and concentrates into titanium dioxide pigments. Scandium can also be obtained from the treatment of red mud, a waste product of the Bayer process used to refine bauxite into alumina.

SUMMARY OF THE DISCLOSURE

In one aspect, a method is provided for making a scandium-containing alloy. The method comprises (a) providing a molten metal; and (b) mixing the molten metal with a scandium-containing precursor which undergoes thermal decomposition at the temperature of the molten metal to produce scandium oxide, thereby producing a scandium-containing alloy.

In another aspect, a method is provided for making a scandium-containing alloy. The method comprises (a) providing a first alloy comprising 0.1 to 2 wt % scandium and 20 to 99.9 wt % aluminum; (b) forming a molten mixture of a first portion of the first alloy and a second portion of another metal or metal alloy; and (c) cooling the molten mixture.

In a further aspect, a method is provided for making a scandium-containing alloy. The method comprises (a) providing a first alloy comprising 0.1 to 30 wt % scandium and 20 to 99.9 wt % aluminum; (b) forming a molten mixture of a first portion of the first alloy and a second portion of another metal or metal alloy; and (c) cooling the molten mixture.

In still another aspect, a metal alloy is provided which comprises (a) 0.1 to 2 wt % scandium; and (b) 5 to 98 wt % aluminum.

In yet another aspect, a metal alloy is provided which comprises (a) 0.1 to 30 wt % scandium by weight; and (b) 20 to 99.9 wt % by weight magnesium.

DETAILED DESCRIPTION

Figure 1:
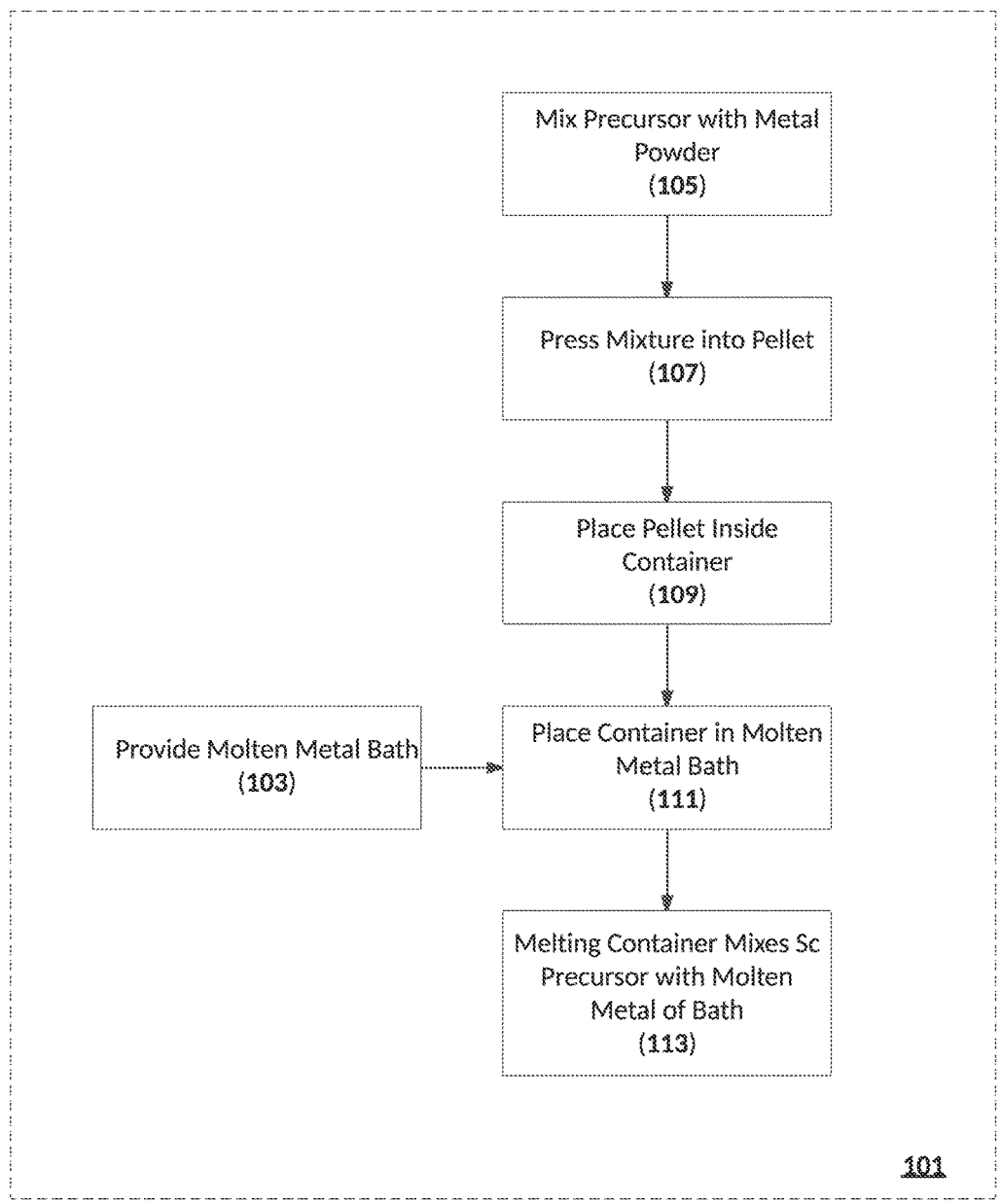
FIG. 1 is a flowchart illustrating an embodiment of a method for producing a scandium alloy in accordance with the teachings herein.

A variety of methods have been developed for the isolation of scandium from a scandium bearing source. In one such method, which is disclosed in U.S. 2012/0207656 (Duyvesteyn), scandium is leached from a scandium bearing ore, and the leachate is subjected to a variety of processing steps to produce a more concentrated scandium solution. The scandium is then precipitated from the solution with oxalic acid, after which the precipitate is washed and is subjected to calcination to produce $Sc_2O_3$. Various other methods are also known to the art which produce $Sc_2O_3$ from a variety of sources.

At present, there is considerable commercial interest in scandium alloys, and especially in Sc—Al alloys, due to the superior hardness, fatigue resistance, weldability and corrosion resistance these alloys offer. However, the incorporation of scandium into aluminum alloys and other metal alloys poses a number of challenges.

For example, one method known to the art for producing Al—Sc alloys involves the direct mixing of Sc metal into Al by melting an Al—Sc master alloy. This approach is typically not commercially feasible, due to the high cost of pure scandium metal.

$Sc_2O_3$ is much less expensive than pure scandium metal, due to the significantly less processing required to make it, and hence its use in making scandium alloys is much more economically attractive. However, the direct addition of Sc$_2$O$_3$ to aluminum and other metals is characterized by heavy burning losses (that is, loss of scandium to a dross that floats on top of the metal bath). In particular, when scandium oxide is added to a bath of molten aluminum, the following reaction takes place:

$$8*Al + Sc_2O_3 \rightarrow 2*Al_3Sc + Al_2O_3 \quad \text{(REACTION 1)}$$

The resulting aluminum oxide will float to the surface of the molten bath, and will typically entrain some undissolved solid scandium oxide into its dross structure. The dross consists then of solid aluminum metal (which acts as a binder), aluminum oxide (produced as a byproduct in REACTION 1), and entrained scandium oxide that had not yet reacted with liquid aluminum. Scandium losses to the dross in a process of this type may be as high as 25-35%.

EP 2298944 (Kwang et al.) identifies a further potential problem with the direct addition of Sc$_2$O$_3$ to aluminum metal baths. In particular, Kwang et al. notes that, when Sc$_2$O$_3$ is added directly to aluminum alloys, the very properties that scandium can impart to the alloy-hardness, fatigue resistance, weldability and corrosion resistance—are compromised, due to the presence of scandium oxides in the alloy. Kwang et al. proposes dealing with this problem by forming a master alloy out of Sc$_2$O$_3$ and a metal melt consisting of magnesium or a magnesium-aluminum mixture. This process of forming the master alloy purportedly reduces Sc$_2$O$_3$ to Sc within the alloy, thus effectively removing the oxygen content. The resulting master alloy may then be used to form aluminum-scandium or aluminum-scandium-magnesium alloys.

U.S. Pat. No. 5,037,608 (Tarcy et al.) and U.S. Pat. No. 5,238,646 (Tarcy et al.) similarly disclose a method for making aluminum-scandium alloys through the reduction of scandium oxide. The method disclosed in these references comprises forming a mixture of powders of scandium oxide and aluminum and/or magnesium. The component powders have similar median particle sizes. The powder mixture is then pressure packed into a pellet, which is then added to a bath of molten aluminum, magnesium or combinations thereof.

While the processes of Kwang et al. and Tarcy et al. may reduce burning losses, they do not eliminate it, since the reaction between aluminum and scandium oxide can still occur. Moreover, while the production of Sc$_2$O$_3$ may require less processing than scandium metal, the number of processing steps to go, for example, from ore leachate to Sc$_2$O$_3$ is still significant. Hence, further reductions in the processing steps required to produce scandium alloys are still needed.

It has now been found that the foregoing needs may be met through the use of a suitable scandium-containing precursor, such as scandium oxalate, to produce scandium alloys. The formation of scandium oxalate requires less processing steps than the formation of Sc$_2$O$_3$. Indeed, in the methodology disclosed in U.S. 2012/0207656 (Duyvesteyn), scandium oxalate is formed as a precursor to Sc$_2$O$_3$.

Moreover, the use of a scandium-containing precursor such as scandium oxalate may reduce or eliminate burn-in. Without wishing to be bound by theory, this is believed to be due, in part, to the high decomposition temperature (600° C.) at which scandium oxalate decomposes to form Sc$_2$O$_3$. The in situ generation of Sc$_2$O$_3$ at these temperatures is believed to allow for better mixing of Sc$_2$O$_3$ with molten aluminum and a better opportunity of forming an aluminum-scandium alloy before any unreacted Sc$_2$O$_3$ is entrained by Al$_2$O$_3$.

FIG. 1 illustrates a first particular, non-limiting embodiment of a method in accordance with the teachings herein. As seen therein, the method 101 comprises providing a molten metal 103 which may be utilized to produce a scandium-containing alloy, preferably by reacting with a scandium-containing precursor to produce the alloy.

The molten metal is preferably aluminum or an aluminum alloy such as, for example, an aluminum-magnesium alloy, although other metals may be utilized in the methodologies described herein as well. Methods for making aluminum-magnesium alloys which may be used as the molten metal are described in WO 99/49089 (Ricketts), entitled "Magnesium Alloying", which is incorporated herein by reference in its entirety.

The precursor is a scandium compound which is preferably capable of undergoing decomposition under the conditions at which it is mixed with the molten metal to produce scandium oxide or scandium metal, thereby producing a scandium-containing alloy. Preferably, the precursor is a scandium composition which undergoes thermal decomposition at the temperature of the molten metal to produce scandium oxide or scandium metal.

The use of scandium oxalate as a precursor is especially preferred. However, in some applications, other suitable precursors may be utilized as well. Such precursors may include, but are not limited to, scandium carbonate, scandium nitrate, or scandium hydroxide, and other organic scandium compounds such as scandium alcoholates and scandium carboxylates, or various mixtures of the foregoing.

In the particular embodiment depicted in FIG. 1, the precursor is mixed 105 with one or more metal powders or granulated metals, and the resulting mixture is pressed 107 into a pellet or other suitable article. Suitable methods for making pressed pellets are known to the art and include, for example, the use of a manual or pneumatic press or a combustion driven compaction system as detailed in U.S. Pat. No. 7,744,812 (Witherspoon et al.), entitled "Dynamic Consolidation of Powders Using a Pulsed Energy Source". In some embodiments, a suitable binder may be utilized for pellet formation.

In the particular embodiment depicted, the pellet is then placed inside of a container 109, and the container is placed 111 in the molten metal bath. The container gradually melts, thus slowly mixing 113 the scandium-containing precursor with the molten metal of the metal bath.

Preferably, the container is kept fully immersed in the molten metal bath while it is melting. The container is preferably made out of aluminum or magnesium metal when used to make aluminum or magnesium alloys containing scandium, although more generally, the choice of materials for the container may depend on the alloy being made. In some embodiments, the container may be fitted with a top and/or with small holes or other means of ventilation to allow vapors and gases to escape. Without wishing to be bound by theory, the use of such a container is believed to reduce or eliminate burning losses by helping to wet the scandium-containing pellet.

When scandium oxalate is utilized as the precursor and the molten metal is heated to a temperature of at least 600° C., it undergoes thermal decomposition upon contact with the molten metal to produce scandium oxide and a gaseous decomposition product (CO and/or CO$_2$). This process occurs in accordance with REACTIONS 2-3 below:

$$Sc_2(C_2O_4)_3 \cdot x^*H_2O^{(s)} \rightarrow Sc_2(CO_3)_3^{(s)} + 3^*CO^{(g)} + x^*H_2O^{(g)} \quad \text{(REACTION 2)}$$

$$Sc_2(CO_3)_3^{(s)} \rightarrow Sc_2O_3^{(s)} + 3^*CO_2^{(g)} \quad \text{(REACTION 3)}$$

The subsequent reactions that occur with magnesium and aluminum metal are shown in REACTIONS 4-5 below:

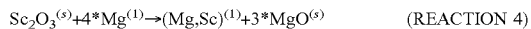
$$Sc_2O_3^{(s)} + 4*Mg^{(l)} \rightarrow (Mg,Sc)^{(l)} + 3*MgO^{(s)} \qquad \text{(REACTION 4)}$$

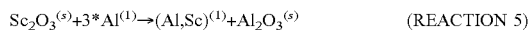
$$Sc_2O_3^{(s)} + 3*Al^{(l)} \rightarrow (Al,Sc)^{(l)} + Al_2O_3^{(s)} \qquad \text{(REACTION 5)}$$

Figure 2:
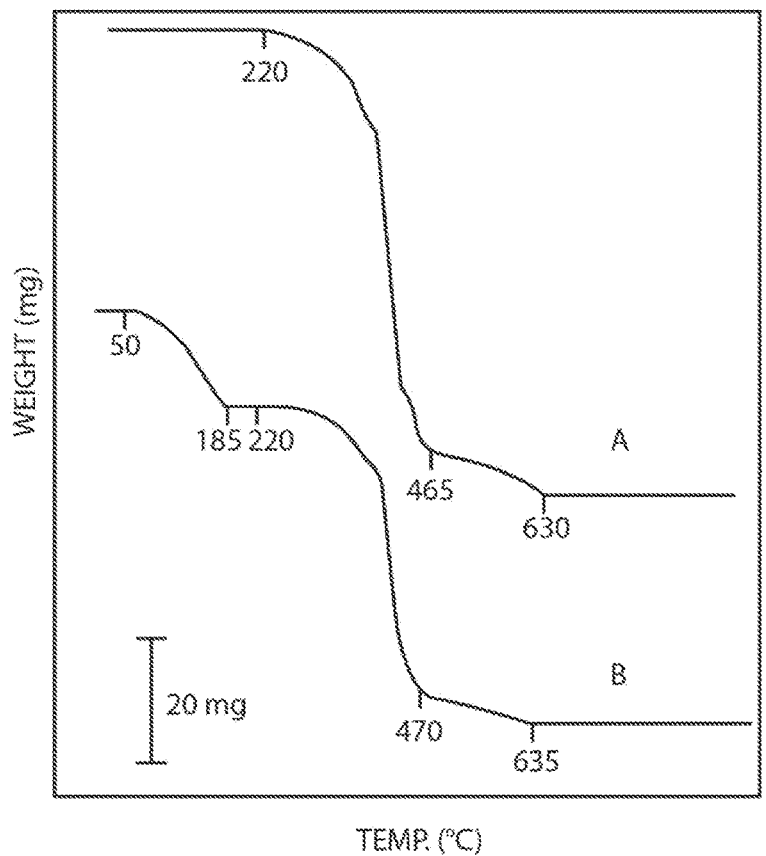
FIG. 2 is a graph of the thermal decomposition curves of scandium oxalate. Curve A is for scandium oxalate 2-hydrate, while Curve B is for scandium oxalate 6-hydrate.

It is to be noted that the decomposition temperatures for scandium oxalate depend on the hydration state of the material. In particular, the 6-hydrate material decomposes to the 2-hydrate material over the temperature range 50° C.-185° C., while the 2-hydrate material decomposes to scandium oxide over the temperature range 220° C.-635° C. The full thermal decomposition curves for scandium oxalate, including scandium oxalate 2-hydrate (curve A) and scandium oxalate 6-hydrate (curve B), are shown in FIG. 2. It will be appreciated from the foregoing that scandium carbonate decomposes at temperatures greater than 500° C., whereas scandium oxalate starts to decompose above 600° C. Hence, in practice, REACTION 3 immediately follows REACTION 2.

Example 1

This example demonstrates the production of scandium oxalate from scandium oxide, and the thermal decomposition of scandium oxalate to scandium oxide.

A solution of scandium oxide was formed by adding 120 ml of concentrated nitric acid and 60 ml of water to 12 g of scandium oxide. The solution was stirred until the scandium oxide was completely dissolved, after which the solution was boiled down to 40 ml (with the evaporation of water and nitric acid). Thereafter, 900 ml of water was added to the concentrated solution to produce a diluted solution, and 40 g of ammonium chloride was added to the diluted solution to adjust the pH of the solution to 1. Oxalic acid dihydrate (33.6 g) was then added to the solution to precipitate scandium oxalate. After the precipitate was aged in the mother liquor for 1 hour, it was collected by filtration and roasted at 900° C. for 2 hours in air, thereby yielding scandium oxide powder.

While EXAMPLE 1 demonstrates the production of scandium oxalate from scandium oxide powder, it will be appreciated that scandium oxalate may be produced instead from a (possibly impure) solution of scandium oxide. Such a solution may be derived, for example, from the leachate in an ore leaching process (such as, for example, a process involving a scandium laterite ore), possibly after subjecting the leachate to ion exchange, solvent extraction, or other purification techniques. Such a solution may also be obtained from other sources (such as, for example, red mud) or from other processes (such as, for example, uranium purification). In some cases, scandium oxalate may be precipitated in relatively pure form from an impure, scandium-containing solution.

In some embodiments of the systems and methodologies described herein, scandium oxide or scandium oxalate may be produced from solutions of scandium oxide that are derived from the dross generated in other methods used to produce scandium master alloys. Such other methods include, without limitation, those methodologies noted above which feature the direct addition of Sc metal or $Sc_2O_3$ into aluminum, as well as the methodologies disclosed in EP 2298944 (Kwang et al.), U.S. Pat. No. 5,037,608 (Tarcy et al.) and U.S. Pat. No. 5,238,646 (Tarcy et al.). In such embodiments, these solutions may be generated by, for example, acid leaching of the dross. The scandium values may then be recovered or isolated by suitable precipitation methods, through the use of suitable ion exchange resins, or by other methods known to the art, and may then be recycled back into the master alloy process. Since some of these underlying methodologies which generate the dross are characterized by poor yields in the first instance (due to scandium loss in the dross), this modification may significantly improve the economic viability of these methods.

The molten metal may be heated to various temperatures at the time the scandium precursor is added. Preferably, the temperature of the molten metal at the time of the addition of the precursor is within the range of 600° C. and 1200° C., more preferably within the range of 650° C. and 800° C., and most preferably within the range of 700° C. and 750° C.

As noted above with respect to the particular, non-limiting embodiment described in FIG. 1, it is preferred to add the scandium precursor to a metal bath or molten metal through the use of a metal container of appropriate construction. However, it is to be understood that embodiments of the methodologies disclosed herein are also possible in which the scandium precursor is added directly to the molten metal, or is added indirectly by other means.

For example, in some embodiments, the scandium precursor may be added in the form of a layer or coating on a metal substrate (such as, for example, a strip of magnesium or aluminum). In some such embodiments, the layer of scandium precursor may be sandwiched between layers of a suitable metal (such as, for example, magnesium or aluminum). Such constructs may be formed in various ways including, for example, by chemical vapor deposition (CVD), by sputtering, by condensation, or by painting, printing or coating the precursor onto a suitable substrate (this may involve the formation of a solution or suspension of the precursor in a solvent medium or binder).

In other embodiments, a powdered scandium precursor may be added directly to the molten metal. The use of powdered scandium oxalate in such a method is especially preferred with Mg—Al melts, due to the ability of scandium oxalate to dissolve well in such melts.

In some applications, burning losses may be tolerable, which may make the direct addition of various scandium precursors to the molten metal bath more attractive or feasible. In such applications, any resulting dross may be subjected to suitable processing to extract scandium values therefrom. For example, such a dross may be subjected to leaching and subsequent solvent extraction and/or ion exchange to produce a scandium solution that may be fed back into the process (for example, by precipitating scandium oxalate from such a solution, which may then be utilized as a scandium precursor in the methods described herein).

Various scandium alloys may be produced with the methodologies described herein. For example, a variety of scandium-aluminum alloys may be produced having 0.1 to 2 wt % scandium and at least 5% or at least 20% aluminum. Similarly, a variety of magnesium alloys may be produced having 0.1 to 30 wt % scandium and at least 5% or at least 20% magnesium. The foregoing alloys may be used as master alloys for the production of still other metal alloys.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limita-

What is claimed is:

1. A method for making a scandium-containing alloy, comprising:
   providing a molten metal; and
   mixing the molten metal with a scandium-containing precursor which undergoes thermal decomposition at the temperature of the molten metal to produce scandium oxide and a gaseous decomposition product, thereby producing a scandium-containing alloy.

2. The method of claim 1, wherein the scandium-containing precursor undergoes thermal decomposition upon contact with the molten metal to produce scandium oxide.

3. The method of claim 2, wherein the scandium-containing precursor undergoes thermal decomposition at the temperature of the molten metal to produce scandium oxide and a gaseous decomposition product.

4. The method of claim 1, wherein the scandium-containing precursor contains carbon.

5. The method of claim 1, wherein the scandium-containing precursor contains at least one carbonyl moiety.

6. The method of claim 1, wherein the scandium-containing precursor is scandium oxalate.

7. The method of claim 1, wherein the scandium-containing precursor is scandium carbonate.

8. The method of claim 1, wherein the molten metal comprises aluminum.

9. The method of claim 1, wherein the molten metal comprises magnesium.

10. The method of claim 1, wherein the molten metal comprises aluminum and magnesium.

11. The method of claim 1, wherein the molten metal has a temperature of at least 600° C. when it is mixed with the scandium-containing precursor.

12. The method of claim 1, wherein the molten metal has a temperature within the range of about 600° C. to about 900° C. when it is mixed with the scandium-containing precursor.

13. The method of claim 1, wherein mixing the molten metal and the scandium-containing precursor produces a dross as a byproduct, and further comprising subjecting the dross to a scandium leaching process to recover scandium values therefrom.

14. The method of claim 1, wherein mixing the molten metal with a scandium-containing precursor includes placing the scandium-containing precursor in a container, and placing the container in the molten metal.

15. The method of claim 14, wherein the container comprises the metal from which the molten metal is derived.

16. The method of claim 14, wherein the molten metal comprises aluminum, and wherein the container also comprises aluminum.

17. The method of claim 14, wherein the molten metal comprises magnesium, and wherein the container also comprises magnesium.

18. The method of claim 14, wherein the molten metal comprises a mixture of aluminum and magnesium, and wherein the container also comprises a mixture of aluminum and magnesium.

19. The method of claim 14, wherein the container is equipped with a plurality of apertures.

20. The method of claim 1, wherein mixing the molten metal with a scandium-containing precursor includes coating a metal substrate with the scandium-containing precursor, and placing the coated substrate in the molten metal.

21. The method of claim 20, wherein the metal substrate comprises at least one metal selected from the group consisting of magnesium and aluminum.

22. The method of claim 1, wherein mixing the molten metal with a scandium-containing precursor includes sandwiching the scandium-containing precursor between first and second sheets of metal, thereby forming a sandwiched structure, and placing the sandwiched structure in the molten metal.

23. The method of claim 22, wherein at least one of the first and second sheets of metal comprises at least one metal selected from the group consisting of magnesium and aluminum.

24. The method of claim 22, wherein each of the first and second sheets of metal comprises at least one metal selected from the group consisting of magnesium and aluminum.

* * * * *